Patented Aug. 29, 1933

1,924,519

UNITED STATES PATENT OFFICE 1,924,519

TREATMENT OF MINERALS

Eugene P. Schoch, Austin, Tex.

No Drawing. Application September 3, 1930
Serial No. 479,581

6 Claims. (Cl. 23—38)

My invention relates to the treatment of minerals and more particularly has reference to the removal of sodium chloride from ores containing other salts desired to be recovered.

The mineral polyhalite $(K_2SO_4,MgSO_4,2CaSO_4,2H_2O)$ occurs in the form of thin beds in the ground in parts of west Texas and southeast New Mexico. While there are some beds of three to six feet in thickness which are, in general, almost free from sodium chloride—containing only ¼ to ½% thereof—yet since they were all deposited from sea water between layers of sodium chloride, it is likely that inclusions of the latter may occur anywhere, and in other instances the sodium chloride is actually dispersed through the polyhalite to any extent possible.

In my prior applications, Serial Nos. 300,959, 329,316 and 405,542, I have described and claimed processes for the recovery of gypsum, potassium sulphate, and magnesium sulphate from polyhalite, krugite ($4CaSO_4.MgSO_4.K_2SO_4.2H_2O$), and other ores containing these salts. In the processes of my prior applications, the potassium and magnesium sulphates are extracted in water solution from the ore while the gypsum remains as an insoluble residue.

I have found that the extraction of magnesium and potassium sulphates from polyhalite, krugite, and like ores containing these salts is seriously complicated when appreciable amounts of sodium chloride are also present in the ore, and since occasional inclusions of sodium chloride are to be expected in even the purest polyhalite occurring in nature, it is evidently necessary and desirable to be able to treat the ore for the removal of sodium chloride preliminarily to the extraction of the sulphates therefrom. However, when plain water is used to remove sodium chloride, the polyhalite or the like is appreciably attacked and serious losses of potassium sulphate result. Thus, when a mixture or ore containing 20% of sodium chloride was leached with water to remove sodium chloride, the amount of potassium sulphate removed therewith amounted to 10 to 20% of the total potassium sulphate present.

It is accordingly an object of the present invention to separate sodium chloride from minerals or ores of the character referred to without materially affecting the ore and without entailing appreciable loss in the sulphates desired to be recovered from the ore.

A further object of my invention resides in the removal of sodium chloride from polyhalite, krugite, and like ores preparatory to the recovery of gypsum, potassium sulphate, and magnesium sulphate, for example, in the manner described in my prior applications above referred to, whereby the presence of sodium chloride does not interfere with the recovery process.

It is a further object of the present invention to provide a process of the character referred to which is simple, economical and efficient in accomplishing its intended purposes.

Theoretically, the only way to prevent decomposition of a mineral such as polyhalite is to bring it in contact with a solution containing all of its constituents in just those concentrations necessary for equilibrium between the mineral and the solution. However, I have found that only a negligible amount of decomposition will take place when polyhalite is in contact with water saturated with magnesium sulphate or with a concentrated solution of magnesium sulphate.

Furthermore, a saturated or concentrated solution of magnesium sulphate will dissolve a certain amount of sodium chloride while precipitating only a slight amount of magnesium sulphate, this taking place without the formation of any other product. For example, a solution saturated with magnesium sulphate at 25° C. contains 54 mols $MgSO_4$ per 1000 mols $H_2O$ and this solution can dissolve 21.5 mols $Na_2Cl_2$ while precipitating 6 mols $MgSO_4$. If more NaCl is dissolved, then Astracanite ($MgSO_4.NaSO_4.4H_2O$) is precipitated. Evidently the latter may be avoided by suitable operation.

Hence, by a combination of these facts I remove any admixed sodium chloride from natural polyhalite and like minerals by leaching out the latter with a saturated or concentrated solution of magnesium sulphate, preferably at about 25° C., using the latter in such proportion that the dissolved sodium chloride will not attain the concentration at which astracanite formation will begin. In this manner the sodium salts may be entirely removed from polyhalite and the like and yet extensive decomposition of the mineral avoided.

In a particular example, with an aggregate of 77% polyhalite and 23% sodium chloride, the latter was thus removed by leaching the aggregate with the $MgSO_4$ solution until the resulting mixture contained only ¼ of one per cent. of sodium chloride and with a loss of potassium sulphate varying from 2.25% to 3.0% of the whole potassium sulphate present while leaching with water entails potash losses which are from three and one-half to eight times as great.

I have also found that it is not necessary that the solution be initially absolutely saturated, but merely so nearly so as to make it practically saturated after it has dissolved the allowable quantity of sodium chloride. Thus no magnesium sulphate is precipitated, and the operation is a little more economical in magnesium sulphate.

After the ore has been substantially freed of admixed sodium chloride by leaching with a concentrated, saturated, or nearly saturated magnesium sulphate solution, it may be processed in any desired manner for the extraction of the soluble potassium and magnesium sulphates from the insoluble gypsum. I prefer, however, to carry out the recovery process in accordance with the inventions of my prior applications referred to, that is, by first roasting the ore and then extracting the soluble sulphates with hot or boiling water. By reason of the preliminary removal of the sodium chloride, there are avoided serious complications in the recovery process which I have found are due to the presence of the chloride during the extraction of the sulphates.

The following example illustrates the preferred method of procedure:

120 gm. of polyhalite containing 6.3% NaCl (or 7.57 grams NaCl and 112.43 grams polyhalite) were ground to pass 20 mesh, and then stirred for five minutes, at 25° C. with a solution composed of 17.3 gm. $MgSO_4$ + 51.7 gm. $H_2O$. The resulting liquid was then filtered off, the residue was washed quickly with another portion of solution of the same composition, the wash liquor removed by filtration, and the residue "sucked as dry as possible." The residue on analysis by titration with $AgNO_3$ solution was found to contain only 0.24% NaCl. The combined leaching and washing solutions, weighing 76 gm. in all, were found to contain 0.76 grams $K_2SO_4$.

This amounts to a $K_2SO_4$ removal amounting to $$\frac{0.76}{112.43} = 0.676\%$$

of the pure polyhalite; while the salt content of the mixture was reduced from 6.3% to 0.24%.

The proportions used above, at 25° C. correspond to using a solution composed of 3 parts of water to 1 part of anhydrous $MgSO_4$; of this solution, 9 parts serve to dissolve 1 part of sodium chloride.

The operation cannot be carried out at temperatures near 0° C., and below—nor at 40° C. and above—but can be carried out within the usual range of "room temperatures," say 10° to 35° C.; however at temperatures above 25 C. the solutions used must be somewhat more concentrated than that used above while at temperatures below 25 C. they must be more dilute. But in all cases, the ratio of $MgSO_4$ to NaCl to be dissolved remains practically the same—as may be seen from tables of solubility.

In practice, the operation is to be carried out substantially as here presented,—namely, a definite amount of crushed ore with a known salt content is to be stirred together with such an amount of solution as corresponds to the directions given above, and when the mixture has had adequate time to react the liquid is to be separated from the solid, and the latter washed. This whole operation can be made continuous by putting liquid and ore together in a long trough and propelling the solid forward at the same rate at which the liquid flows forward.

If the relative amount of solution used is less than corresponds to the proportions above, astrakanite ($MgSO_4Na_2SO_44H_2O$) will be formed and precipitated; this is evidently to be avoided. If the relative amount of solution is greater, then no harm will result except that the operation will entail the use of more $MgSO_4$.

Although I have described the operation with considerable particularity, I do not wish this invention to be limited except as by the scope of the appended claims.

Having described my invention, I claim:

1. The method of treating polyhalite for the removal of sodium chloride which comprises leaching the ore with a concentrated solution of magnesium sulphate.

2. The method of treating polyhalite for the removal of sodium chloride which comprises leaching the ore with a saturated solution of magnesium sulphate.

3. The method of treating polyhalite for the removal of sodium chloride which comprises leaching the ore with a concentrated solution of magnesium sulphate in such proportion that the dissolved sodium chloride does not attain the concentration at which astracanite formation occurs.

4. The method of treating polyhalite for the removal of sodium chloride which comprises leaching the ore with a saturated solution of magnesium sulphate in such proportion that the dissolved sodium chloride does not attain the concentration at which astracanite formation occurs.

5. In the extraction of soluble sulphates from polyhalite, the improvement which comprises removing sodium chloride from the ore by leaching with a concentrated magnesium sulphate solution prior to the treatment of the ore for extraction of the sulphates.

6. The improvement as defined in claim 5 further characterized in that the leaching is so controlled that the dissolved sodium chloride does not attain the concentration at which astracanite formation occurs.

EUGENE P. SCHOCH.